Feb. 11, 1964

F. H. CLARKSON 3,120,961

CHUCKS

Filed Nov. 9, 1961

Inventor:-
Frank Henry Clarkson

Watson, Cole, Grindle & Watson
Attorneys

United States Patent Office 3,120,961
Patented Feb. 11, 1964

3,120,961
CHUCKS
Frank Henry Clarkson, Coventry, England, assignor to Clarkson (Engineers) Limited, Nuneaton, Warwickshire, England, a British company
Filed Nov. 9, 1961, Ser. No. 151,245
Claims priority, application Great Britain Aug. 8, 1961
2 Claims. (Cl. 279—51)

This invention relates to chucks of the kind in which a collet therein receives the threaded end of a tool shank in screw threaded engagement therewith whereby on the tool tending to turn relative to the chuck under cutting or like load, axial thrust is imparted to the collet for increasing the grip of the latter about the tool shank due to the coaction of complementary coned or tapered portions of the collet and a surrounding sleeve received by a bore therefor in the chuck body.

The object of the invention is to provide an improved chuck of the above mentioned kind of simple and robust construction for obtaining firm and accurate holding of a tool under working conditions and in which release of the tool may be readily effected when required.

Figure 1:
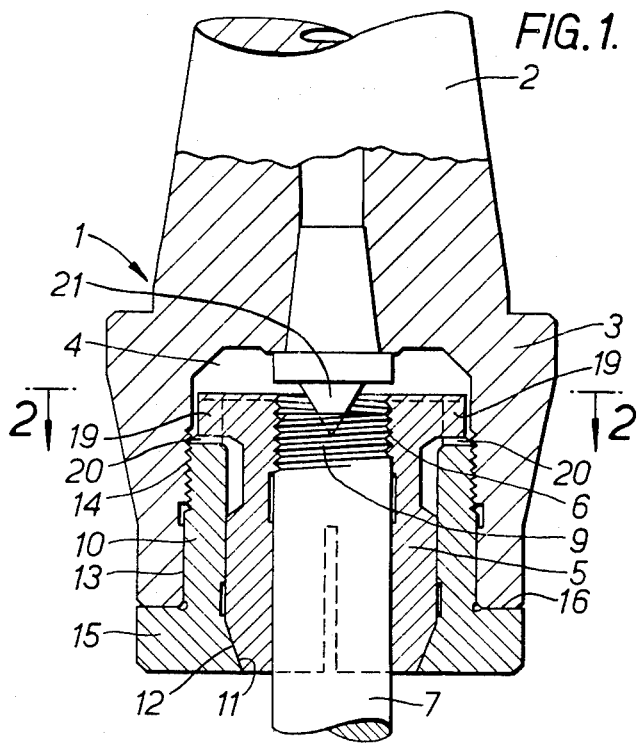
Figure 2:
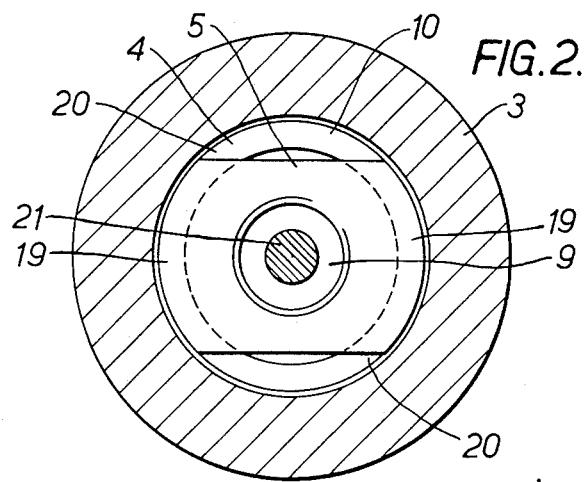

In the accompanying drawings:

FIGURE 1 is a view mainly in axial plane section of a chuck according to this invention and FIGURE 2 is a cross section taken on the line 2—2 of FIGURE 1.

Referring to the drawings the chuck body 1 may be of the usual form i.e. having a rear taper shank 2 for mounting purposes and a forward portion or head 3 having an axial bore 4 open at its leading end for receiving the collet and sleeve assembly.

The bore of the split collet 5 is threaded at its inner end at 6 for receiving in the usual manner a tool shank 7 having a correspondingly threaded rear end 9. Further in accordance with normal practice the collet 5 is received by a bore of a concentric sleeve 10, the leading end of the collet 5 being exteriorly coned or tapered at 11 for co-operation with a correspondingly coned or tapered portion 12 of the sleeve bore whereby on relative forward axial movement of the collet 5 taking place in the sleeve 10 contraction of the collet 5 is effected about a tool shank 7.

A plain cylindrical forward portion 13 of the sleeve 10 is arranged to have an accurate working fit in a corresponding part of the chuck body bore 4 while the sleeve 10 also has a screw threaded engagement at 14 with another or inner part of said bore 4. The thread at 14 is of the same hand as that of the screw threaded engagement of the tool shank 7 with the collet 5 i.e. usually right handed.

In position of use the sleeve 10 is arranged to protrude beyond the leading end of the chuck body head 3, the leading end of the sleeve 10 being flanged at 15 so that the rear of the flange 15 may abut the leading end face 16 of the chuck body head 3 for further location and rigidity of the sleeve in relation to the latter.

It will be appreciated that the dual location afforded by the plain cylindrical portion 13 of the sleeve 10 in the bore 4 and by the abutment of the flange 15 with the leading end face 16 ensures a very high degree of accuracy in firmly holding a tool while as shown a substantial thickness of the sleeve 10 is made possible within normal dimensions of the chuck in order to resist distortion, fracture, or bursting under heavy working loads.

In addition to a friction driving engagement that exists under working conditions between the collet 5 and sleeve 10, a positive rotational driving or dogged engagement is also provided and this may conveniently be achieved by means of radial projections or flanges 19 extending outwardly from the rear end of the collet 5 and engaging corresponding gaps or openings 20 therefor at the inner end of the sleeve 10. While providing a driving engagement for turning movement of the collet 5 and sleeve 10 together, the engagement also permits a sufficient degree of axial movement of the collet 5 relative to the sleeve 10.

A substantial driving engagement 19, 20, may be provided in this way whilst the usual practice of locating the inner end of the sleeve 10 against rotation relative to the chuck body 1 is obviated.

When the chuck is ready for use the sleeve 10 should be fully screwed home into the chuck body bore 4 and in mounting the shank 7 of a rotary tool such as a milling cutter in the chuck, the shank 7 is inserted and screwed into the collet 5 to end abutment within the chuck body bore 4 in the usual way. The inner or rear end of the shank 7 is preferably located in this way by abutment with the point of a centre 21 provided within the chuck body 1 in the usual manner.

Under operating conditions and on the tool shank 7 tending to turn relative to the collet 5 due to a cutting or like load a forward axial thrust is imparted to the collet 5 relative to the sleeve 10 for increasing the grip of the collet 5 about the tool shank 7. In addition to such axial thrust the collet 5 also tends to turn with the tool shank 7 relative to the chuck body 1 and thus impart similar turning movement to the sleeve 10 by virtue of the driving engagement 19, 20, between the collet 5 and sleeve 10. This serves to tighten the sleeve 10 in the chuck body bore 4 and also cause the sleeve flange 15 to firmly abut the leading end face 16 of the chuck body head 3. As a result a firm and accurate interfitting of the sleeve 10, collet 5 and tool shank 7 within the chuck body bore 4 is obtained with a view to securing a high degree of accuracy in the operation of the tool.

The periphery of the sleeve flange 15 is formed for engagement by a spanner or other suitable tool so that when it is desired to release the milling cutter or rotary tool from the chuck the sleeve 10 is simply turned in the opposite or unscrewing direction.

I claim:

1. A chuck comprising a chuck body having a mounting shank and having an axial bore open at the leading end of the chuck body, said bore having an internal threaded portion; abutment means provided at the inner end of said bore for locating the end of a tool shank received by the chuck against axial movement relative to the chuck body; a sleeve co-axially received by said chuck body bore, said sleeve having a threaded portion engaging the threaded portion of said bore whilst the internal bore of the sleeve has a taper portion; and a collet coaxially received by said sleeve and having a positive dogged driving engagement with the sleeve such that some relative axial movement of the collet and sleeve is permitted, said collet having a complementary external taper portion co-operating with the taper bore portion of the sleeve whilst said collet has an internal threaded portion which is engaged by a tool shank on the latter being received by the collet to end abutment in the chuck body whereby on the tool tending to turn relative to the collet under cutting or similar load, tightening of the collet about the tool shank and in the sleeve is obtained as well as tightening of the sleeve in the chuck body bore.

2. A chuck comprising a chuck body having a mounting shank and having an axial bore open at the leading end of the chuck body, said bore having an internal threaded portion and an internal plain cylindrical portion; a co-axial centre provided at the inner end of said bore for locating the end of a tool shank received by the chuck against axial movement relative to the chuck body; a sleeve co-axially received by said chuck body bore, said sleeve having a threaded portion engaging the threaded portion of said bore and a plain cylindrical portion in locating engagement with the plain cylindrical portion of the chuck body bore and also a flange at the leading end for abutment against the leading end of the chuck body whilst the internal bore of the sleeve has a taper portion; and a collet coaxially received by said sleeve and having dogs in positive driving engagement with the sleeve such that some relative axial movement of the collet and sleeve is permitted, said collet having a complementary external taper portion cooperating with the taper portion of the sleeve bore whilst the collet has an internal threaded portion which is engaged by a tool shank on the latter being received by the collet to end abutment within the chuck body whereby on the tool tending to turn relative to the collet under cutting or similar load, axial thrust is imparted to the collet for tightening thereof about the tool shank and in the sleeve whilst any rotation of the collet causes tightening of the sleeve in the chuck body bore and of the flange of said sleeve against the leading end of the chuck body.

References Cited in the file of this patent

UNITED STATES PATENTS

| | | |
|---|---|---|
| 2,367,998 | Clarkson | Jan. 23, 1945 |
| 2,670,963 | Osborn | Mar. 2, 1954 |

FOREIGN PATENTS

| | | |
|---|---|---|
| 827,169 | Great Britain | Feb. 3, 1960 |